US011502819B2

(12) United States Patent
Schneider et al.

(10) Patent No.: US 11,502,819 B2
(45) Date of Patent: Nov. 15, 2022

(54) EFFICIENT MASKED POLYNOMIAL COMPARISON

(71) Applicant: NXP B.V., Eindhoven (NL)

(72) Inventors: Tobias Schneider, Styria (AT); Joppe Willem Bos, Wijgmaal (BE); Joost Roland Renes, Eindhoven (NL); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 135 days.

(21) Appl. No.: 17/154,116

(22) Filed: Jan. 21, 2021

(65) Prior Publication Data

US 2022/0231831 A1 Jul. 21, 2022

(51) Int. Cl.
*H04L 9/00* (2022.01)
(52) U.S. Cl.
CPC .......... *H04L 9/002* (2013.01); *H04L 2209/04* (2013.01)
(58) Field of Classification Search
CPC .............................. H04L 9/002; H04L 2209/04
See application file for complete search history.

(56) References Cited

U.S. PATENT DOCUMENTS

| | | | |
|---|---|---|---|
| 10,430,565 B2 * | 10/2019 | Moritz | G06F 9/30003 |
| 10,521,586 B2 | 12/2019 | Berthier et al. | |
| 2008/0109501 A1 * | 5/2008 | Douguet | G06F 7/722 |
| | | | 708/250 |
| 2011/0016167 A1 * | 1/2011 | Dupaquis | G06F 7/726 |
| | | | 708/250 |
| 2015/0067875 A1 * | 3/2015 | Johnson | H04L 9/0631 |
| | | | 726/26 |

(Continued)

OTHER PUBLICATIONS

Cheval et al.; "Lengths May Break Privacy—Or How to Check for Equivalences with Length", 2013, SpringerLink, CAV 2013, LNCS 8044, pp. 708-723. (Year: 2013).*

(Continued)

*Primary Examiner* — Matthew Smithers

(57) ABSTRACT

Various embodiments relate to a method and system for securely comparing a first and second polynomial, including: selecting a first subset of $k$ coefficients of the first polynomial and a second subset of $k$ corresponding coefficients of the second polynomial, wherein the coefficients of the first polynomial are split into $n$ shares and the first and second polynomials have $m$ coefficients; subtracting the second subset of coefficients from one of the shares of the first subset of coefficients; reducing the number of elements in the first subset of coefficients to $l$ elements by combining groups of $k/l$ elements together; generating a random number for each of the elements of the reduced subset of coefficients; summing the product of each of the elements of the reduced subset of coefficients with their respective random numbers; summing the $n$ shares of the sum of the products; and generating an output indicating that the first polynomial does not equal the second polynomial when the sum does not equal zero.

16 Claims, 1 Drawing Sheet

(56) References Cited

U.S. PATENT DOCUMENTS

2015/0082435 A1* 3/2015 Roussellet .............. G06F 21/64
                                                      726/23
2019/0140818 A1* 5/2019 Bent .................... H04L 9/3093

OTHER PUBLICATIONS

Bache, Paglialonga, Oder, Schneider, Guneysu: High-Speed Masking for Polynomial Comparison in Lattice-based KEMs. IACR Trans. Cryptogr. Hardw. Embed. Syst. 2020(3): 483-507.
Barthe Belaid, Espitau, Fouque, Gregoire, Rossi, Tibouchi: Masking the GLP Lattice-Based Signature Scheme at Any Order. EUROCRYPT (2) 2018: 354-384.
Lyubashevsky, Peikert, Regev: On Ideal Lattices and Learning with Errors over Rings. J. ACM 60(6): 43:1-43:35 (2013).
National Institute of Standards and Technology, Post-quantum cryptography standardization, https://csrc.nist.gov/Projects/Post-Quantum-Cryptography/Post-Quantum-Cryptography-.
Oder, Schneider, Poppelmann, Guneysu: Practical CCA2-Secure and Masked Ring-LWE Implementation. IACR Trans. Cryptogr. Hardw. Embed. Syst. 2018(1): 142-174 (2018).
Ravi, Roy, Chattopadhyay, Bhasin:Generic Side-channel attacks on CCA-secure lattice-based PKE and KEMs. IACR Trans. Cryptogr. Hardw. Embed. Syst. 2020(3): 307-335 (2020).
Regen: On lattices, learning with errors, random linear codes, and cryptography. STOC 2005: 84-93.
Rivain, Prouff: Provably Secure Higher-Order Masking of AES. CHES 2010: 413-427.
Bhasin, Shivam et al.; "Attacking and Defending Masked Polynomial Comparison for Lattice-Based Cryptography"; IACR eprint 2021; https://eprint.iacr.org/2021/104.

* cited by examiner

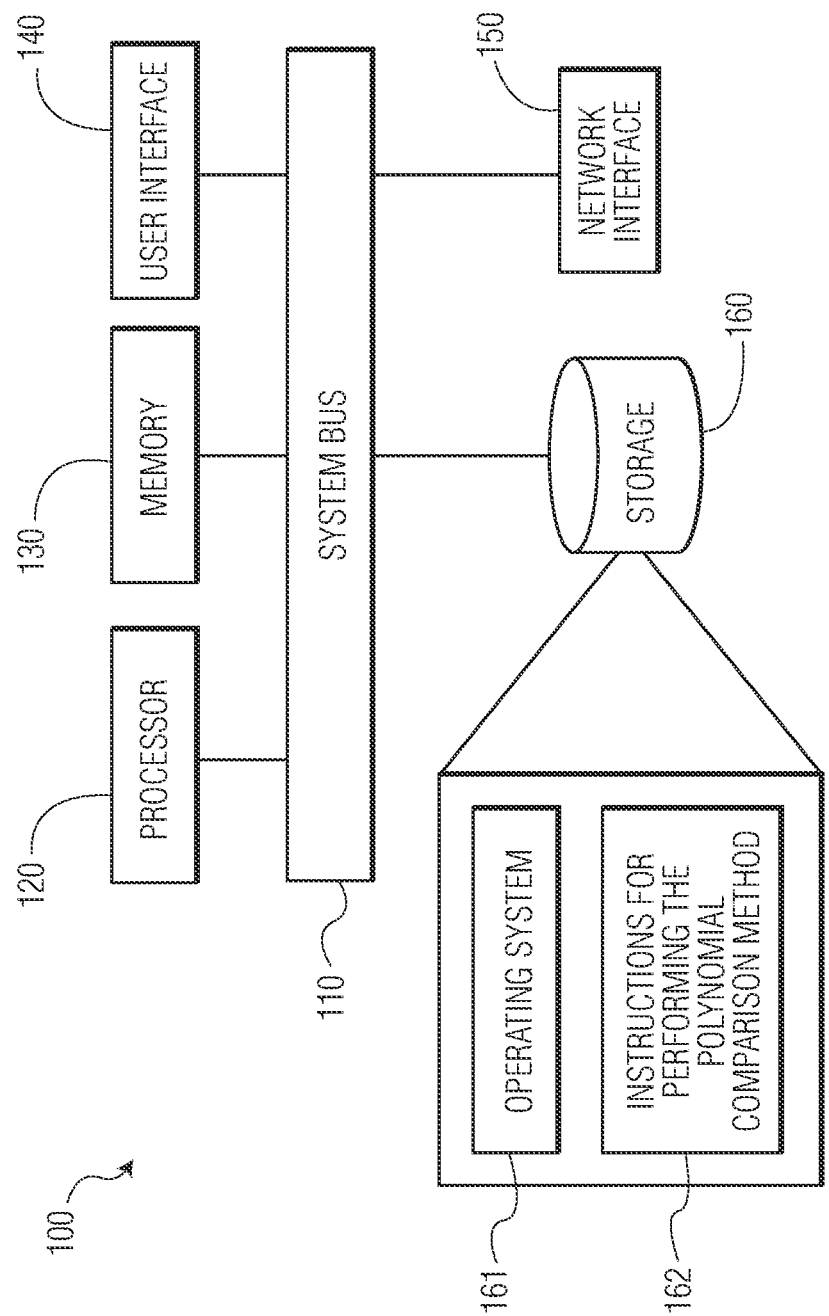

EFFICIENT MASKED POLYNOMIAL COMPARISON

TECHNICAL FIELD

Various exemplary embodiments disclosed herein relate generally to efficient masked polynomial comparison.

BACKGROUND

The comparison of polynomials is an essential operation for several post-quantum cryptographic schemes. One potent type of attack, so-called side-channel analysis, exploits data dependencies in physical measurements of the target device (e.g., power consumption) and can be thwarted with the help of masking the processed data. While there have been prior approaches to mask the polynomial comparison step, they suffer from a significant performance overhead and limited applicability.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for securely comparing a first and a second polynomial, including: selecting a first subset of k coefficients of the first polynomial and a second subset of k corresponding coefficients of the second polynomial, wherein the coefficients of the first polynomial are split into n shares and the first and second polynomials have m coefficients; subtracting the second subset of coefficients from one of the shares of the first subset of coefficients; reducing the number of elements in the first subset of coefficients to l elements by combining groups of k/l elements together; generating a random number for each of the elements of the reduced subset of coefficients; summing the product of each of the elements of the reduced subset of coefficients with their respective random numbers; summing the n shares of the sum of the products; and generating an output indicating that the first polynomial does not equal the second polynomial when the sum does not equal zero.

Various embodiments are described, further comprising repeating the steps of claim 1 m/k times such that all of the m coefficients of the first and second polynomials are selected.

Various embodiments are described, wherein combining groups of k/l elements together includes adding the k/l elements together.

Various embodiments are described, wherein adding the k/l elements together is done mod q, wherein q is a modulus.

Various embodiments are described, wherein subtracting the second subset of coefficients from one of the shares of the first subset of coefficients is done mod q, wherein q is a modulus.

Various embodiments are described, wherein generating a sum of the product of each of the elements of the reduced subset of coefficients with their respective random numbers is done mod q, wherein q is a modulus.

Various embodiments are described, wherein arithmetic operations are done mod q, wherein q is a modulus, further comprising selecting values for q and l such that $q^{-(l-1)}$ is less than specified leak probability.

Various embodiments are described, wherein arithmetic operations are done mod q, wherein q is a modulus, further comprising selecting values for q, m, and k such that $$q^{\frac{m}{k}}$$

is less than specified comparison failure rate.

Further various embodiments relate to a polynomial comparator configured to compare a first and a second polynomial, including: a memory; a processor coupled to the memory, wherein the processor is further configured to: select a first subset of k coefficients of the first polynomial and a second subset of k corresponding coefficients of the second polynomial, wherein the coefficients of the first polynomial are split into n shares and the first and second polynomials have m coefficients; subtract the second subset of coefficients from one of the shares of the first subset of coefficients; reduce the number of elements in the first subset of coefficients to l elements by combining groups of k/l elements together; generate a random number for each of the elements of the reduced subset of coefficients; sum the product of each of the elements of the reduced subset of coefficients with their respective random numbers; sum the n shares of the sum of the products; and generate an output indicating that the first polynomial does not equal the second polynomial when the sum does not equal zero.

Various embodiments are described, further comprising repeating the steps of claim 1 m/k times such that all of the m coefficients of the first and second polynomials are selected.

Various embodiments are described, wherein combining groups of k/l elements together includes adding the k/l elements together.

Various embodiments are described, wherein adding the k/l elements together is done mod q, wherein q is a modulus.

Various embodiments are described, wherein subtracting the second subset of coefficients from one of the shares of the first subset of coefficients is done mod q, wherein q is a modulus.

Various embodiments are described, wherein generating a sum of the product of each of the elements of the reduced subset of coefficients with their respective random numbers is done mod q, wherein q is a modulus.

Various embodiments are described, wherein arithmetic operations are done mod q, wherein q is a modulus, further comprising selecting values for q and l such that $q^{-(l-1)}$ is less than specified leak probability.

Various embodiments are described, wherein arithmetic operations are done mod q, wherein q is a modulus, further comprising selecting values for q, m, and k such that $$q^{\frac{m}{k}}$$

is less than specified comparison failure rate.

BRIEF DESCRIPTION OF THE DRAWINGS

In order to better understand various exemplary embodiments, reference is made to the accompanying drawings, wherein:

FIG. 1 illustrates an exemplary hardware diagram for implementing the polynomial comparator.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies, such as the call for proposals for new public-key cryptography standards by the National Institute of Standards and Technology (NIST).

There are various families of problems to instantiate these post-quantum cryptographic approaches. Constructions based on the hardness of lattice problems are considered to be promising candidates to become the next standard. A subset of approaches considered within this family are instantiations of the Learning With Errors (LWE) framework and the Ring-Learning With Errors problem. Another subset of approaches is based on recovering a quotient of polynomials in a ring. Examples of the former include Kyber and NewHope, and examples of the latter include NTRU-HRRS-KEM and Streamlined NTRU Prime. In these schemes, the operations involve arithmetic of polynomials with integer coefficients.

When these schemes are implemented, the main computationally expensive operations besides hashing are the arithmetic with polynomials. More precisely, computations are done in a ring $R_q = (\mathbb{Z}/q\mathbb{Z})[X]/(F)$: the coefficients of the polynomial are in $\mathbb{Z}/q\mathbb{Z}$ while the polynomial arithmetic is modulo F.

Implementation attacks, e.g., side-channel analysis, may be used against post-quantum cryptography protocols. The decapsulation operation of a Key Encapsulation Mechanisms (KEM) extracts an encapsulated key from a given ciphertext using a secret key. If this secret key were to be leaked, it would invalidate the security properties provided by the KFM. It has been shown in Prasanna Ravi, Sujoy Sinha Roy, Anupam Chattopadhyay, and Shivam Bhasin, *Generic side-channel attacks on cca-secure lattice-based PKE and kems*, IACR Trans. Cryptogr. Hardw. Embed. Syst. 2020 (2020), no. 3, 307-335, that unprotected implementations of post-quantum schemes are vulnerable to implementation attacks, e.g., side-channel analysis. In particular, it was demonstrated that the secret key can be extracted from physical measurements of key-dependent parts in the decapsulation operation. For several post-quantum KEMs, these key-dependent parts include a check for equality of two polynomials. Therefore, a secure implementation of these KEMs requires the integration of dedicated countermeasures for this comparison step.

Masking is a common countermeasure to thwart side-channel analysis and has been utilized for various applications. Besides security, efficiency is also an important aspect when designing a masked algorithm. Important metrics for software implementations of masking are the number of operations and the number of fresh random elements required for the masking scheme. For the masked comparison of two polynomials, a first solution was presented in Tobias Oder, Tobias Schneider, Thomas Pöppelmann, and Tim Güneysu, *Practical cca2-secure and masked ring-luve implementation*, IACR Trans. Cryptogr. Hardw. Embed. Syst. 2018 (2018), no. 1, 142-174. The authors propose to utilize a hash function and construct a specialized solution for a particular KFM at a low protection order. It therefore has only limited applicability. An alternative approach was presented in Gilles Barthe, Sonia Belaïd, Thomas Espitau, Pierre-Alain Fouque, Benjamin Grégoire, Mélissa Rossi, and Mehdi Tibouchi, *Masking the GLP lattice-based signature scheme at any order*, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384. While the original publication is dedicated to the protection of a lattice-based signature schemes (and not KEMs), the idea of using special mask conversion algorithms for comparison can be easily translated to the case of KEMs. In contrast to the first solution by Oder et al., their solution can be instantiated at various protection orders, but still introduces a significant overhead in both number of operations and of fresh random elements. A more efficient approach based on the idea of batching the comparison of multiple coefficients of the polynomials was recently presented in Florian Bache, Clara Paglialonga, Tobias Oder, Tobias Schneider, and Tim Güneysu, *High-speed masking for polynomial comparison in lattice-based kems*, IACR Trans. Cryptogr. Hardw. Embed. Syst. 2020 (2020), no. 3, 483-507. In this way, a significantly faster comparison of the complete polynomial can be achieved.

Embodiments will be described that improve on the state-of-the-art enabling a significantly more efficient implementation of a protected polynomial comparison. It improves both the number of operations and random elements, while not suffering from the limited applicability, i.e., it may be instantiated for various practically relevant security orders.

The embodiments disclosed herein use a new way of batching the polynomial coefficients for comparison, which enables a more efficient implementation. In particular, it helps to significantly reduce the number of operations and random elements compared to the prior art. The improvements are based on a better understanding of the security provided by the masking scheme, allowing a trade-off between performance and security.

Embodiments of a polynomial comparator will now be described. Let $f \in \mathbb{Z}_q[X]$ be a polynomial of degree (at most) m−1: i.e., $f(X) = \sum_{j=0}^{m-1} x_j X^j$, where $x = (x_0, \ldots, x_{m-1})$. An arithmetic sharing of a polynomial x is written as x consisting of n arithmetic shares $x^{(i)}=(x_0^{(i)}, \ldots, x_{m-1}^{(i)})$, $0 \leq i < n$ such that $\sum_{i=0}^{n-1} x_j^{(i)} = x_j$ and $$f(X) = \sum_{j=0}^{m-1}\sum_{i=0}^{n-1} x_j^{(i)} X^j \equiv \sum_{j=0}^{m-1} x_j X^j \pmod{q}. \qquad (X)$$

The goal of polynomial comparator is to compare two input polynomials where:
- a: The polynomial a is secret and should not be leaked to the attacker. Therefore, it is stored and processed in n shares. The sharing of a is denoted as a.
- b: This polynomial is public and does not need to be protected. Therefore, it is stored and processed in plain.

The output c of the polynomial generator is set to 1 if a equals b, which means that all coefficients of a are the same as in b. Otherwise, the output is set to 0. The polynomial comparator is highly optimized to provide both good performance (i.e, low number of operations and required random elements) and sufficient protection against side-channel analysis. It may be adapted to fit various use cases with the following parameters:
- n: The number of shares used in the sharing of the secret polynomial. Increasing this value will improve the side-channel security, but also lower the performance of the comparison.
- m: This indicates the degree of the polynomials which should be compared. Usually, this is fixed by the use case. However, it is important to adapt the parameter k (described below) to the degree to ensure optimal performance and adequate security and correctness.
- k: The comparison does not directly work on m coefficients. Instead, it is split up into $$\frac{m}{k}$$

comparisons of k coefficients each. Note that k does not need to divide m and it is possible to process coefficient subsets of unequal size, if the smallest subset is sufficiently large to provide the desired side-channel security and the total number of subsets is sufficiently large to ensure correctness. If at least one of these comparisons indicates a difference, the output c is set to 0. The parameter k needs to be set carefully depending on the use case. As detailed below, it has strong implications on the performance and security of the resulting solution.
- l: Each comparison of k coefficients is further optimized by summing sets of coefficients before randomization. As shown later, this helps to reduce the randomness requirements. The k coefficients are split into l sets of $$\frac{k}{l}$$

coefficients which are summed, and the result is then randomized with a multiplicative mask. Note again that l does not need to divide k, and it is possible to process subsets of unequal size, if the total number of subsets l is sufficiently large to provide the desired side-channel security.

Below is an embodiment of a method for comparing two input polynomials a and b where the output is c. The polynomial comparator implements this method.

---

Input: An arithmetic sharing a of a polynomial $a \in \mathbb{Z}_q$ [X] and a polynomial $b \in \mathbb{Z}_q$ [X].
Output: c = 1 whenever a equals b and c = 0 otherwise.

---

1:      c = 1
2:      for h = 0 to $\frac{m}{k} - 1$ do
3:          $x = (a_{h \cdot k}, \ldots, a_{(h+1) \cdot k - 1})$
4:          $x^{(0)} = x^{(0)} - (b_{h \cdot k}, \ldots, b_{(h+1) \cdot k - 1})$ mod q
5:          for i = 0 to l − 1 do
6:              for j = 0 to $\frac{k}{l} - 1$ do
7:                  $x_i = x_i + x_{j \cdot l + i}$ mod q
8:          $x = (x_0, \ldots, x_{l-1})$
9:          z = 0
10:         for i = 0 to l − 1 do
11:             $r \leftarrow \mathbb{F}_q$
12:             $z = z + x_i \cdot r$ mod q
13:          for i = 1 to n − 1 do
14:             $z^{(0)} = z^{(0)} + z^{(i)}$ mod q
15:          if $z^{(0)} \neq 0$ then
16:             c = 0
17:      return c

---

The method begins by initializing the output c=1, which indicates that the input polynomials match. Accordingly, the method will set c=0 when it finds that the polynomials do not match. At step 2 a loop is initialized that operates over $$\frac{m}{k}$$

iterations. Each iteration selects k values of the coefficients of the polynomials a and b for comparison. At step 3 a matrix x of size n×k is set such that each of the k columns contains the n shares of a coefficient of a. At step 4, all of the k coefficients of b are subtracted from the first share (or row) $x^{(0)}$ mod q. It is noted that the coefficients of b may be subtracted from any one of the shares of x. In steps 5 to 8, several columns of x are combined by summing mod q to reduce the number of columns of x. This has the effect of combining groups of $$\frac{k}{l}$$

values together. The resulting x has dimensions of n×l. Next at step 9, a vector z with a size of n is initialized to all zeros. At step 10, a loop is initialized that loops over l iterations. At step 11, a random number r is generated. Then at step 12, $x_i$ is multiplied by r and then added to z mod q. This is done l times. At steps 13 and 14, the individual values of z are summed mod q. At steps 15 and 16, if $z^{(0)}$ does not equal zero, then c is set to zero indicating that the polynomials do not match. After each iteration over the value h has completed, then the value of c is returned.

It is noted that the comparison is not completely correct due to the optimizations, but as detailed now its error probability can be made negligible by appropriately choosing the aforementioned parameters. For each of the $$\frac{m}{k}$$

comparisons, the deciding factor is if the randomized sum of the k coefficients is 0 modular q. For the case that a=b, the sum will always be 0. However, for cases with a≠b, there is a probability of roughly $q^{-1}$ that the randomized sum will be 0 by chance. To make the complete comparison of a with b fail, all $$\frac{m}{k}$$

comparisons would need to fail. The probability of this can be estimated with $$q^{-\frac{m}{k}}.$$

Depending on the use case, k should be chosen to ensure that this probability is negligible.

For side-channel protection, multiplicative masks are used to randomize the sum of the coefficients before unmasking (i.e. summing all shares) them. The resulting side-channel security is affected by both (a) the type of masks (i.e., if they are generators) and (b) how many of them are used. For (a), there is not a problem for prime moduli, because all elements are generators. For (b), instead of using a fresh random mask for each coefficients, we propose to reuse masks for multiple coefficients, which is practically achieved by summing them before randomization. This is mainly controlled with the parameter l, where setting a smaller l will result in a more efficient, but less secure implementation.

Overall, the side-channel security is mainly affected by specific inputs for which the proposed scheme is found to be leaking. For the solution proposed in Bache, each comparison of k coefficients has exactly one leaking input, which results in a leak probability of $q^{-k}$. In polynomial comparator, the number of leaking inputs is increased to q leaking inputs for each comparison. Note, not all k coefficients are randomized for each comparison, but the k coefficients are reduced first to l coefficients which are randomized. Therefore, the leak probability for the polynomial comparator is $q^{-l} \cdot q = q^{-(l-1)}$. The polynomial comparator may be adapted to fit the security requirements of the use case by choosing appropriate parameters l and k.

The polynomial comparator requires fewer operations versus the prior art as follows.

|  | Polynomial Comparator | Fast prior art |
| --- | --- | --- |
| # of modular multiplications | $\frac{m}{k} \cdot l \cdot n$ | $\frac{m}{k} \cdot k \cdot (n+2)$ |
| # of modular additions | $\frac{m}{k} \cdot (k + (k+1) \cdot n + n - 1)$ | $\frac{m}{k} \cdot (k \cdot (n \cdot 2 + 2) + n - 1)$ |
| # of random elements | $\frac{m}{k} \cdot l$ | $\frac{m}{k} \cdot k \cdot 2$ |

For the number of modular multiplications l<k and n<n+2, so there is a clear reduction. For the number of modular additions k<2·k and k+l<2·k, so there is a clear reduction. Finally, for the number of random elements l<2·k, so there is a clear reduction.

FIG. 1 illustrates an exemplary hardware diagram 100 for implementing the polynomial comparator. As illustrated, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), field programmable gate array (FPGA), application-specific integrated circuit (ASIC), or other similar devices.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user as needed. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 162 may include instructions for implementing the polynomial comparison method described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

The polynomial comparator and method described herein provides a technological solution to improving the security and speed of comparing two polynomials as required in many post-quantum cryptographic systems. The polynomial comparator uses shares to mask the coefficients of a secret polynomial, and then does a comparison in batches and combines coefficients. Random numbers are then generated and used to further combine the coefficients to determine if they two polynomials are identical. As described above, the polynomial comparator reduces the number of operations needed for the comparison, while allowing for the various parameters to be selected to achieve various desired security performance.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for securely comparing a first and a second polynomial, comprising:
    selecting a first subset of $k$ coefficients of the first polynomial and a second subset of $k$ corresponding coefficients of the second polynomial, wherein the coefficients of the first polynomial are split into $n$ shares and the first and second polynomials have $m$ coefficients;
    subtracting the second subset of coefficients from one of the shares of the first subset of coefficients;
    reducing the number of elements in the first subset of coefficients to $l$ elements by combining groups of $k/l$ elements together;
    generating a random number for each of the elements of the reduced subset of coefficients;
    summing the product of each of the elements of the reduced subset of coefficients with their respective random numbers;
    summing the $n$ shares of the sum of the products; and
    generating an output indicating that the first polynomial does not equal the second polynomial when the sum does not equal zero.

2. The method of claim 1, further comprising repeating the steps of claim 1 $m/k$ times such that all of the $m$ coefficients of the first and second polynomials are selected.

3. The method of claim 1, wherein combining groups of $k/l$ elements together includes adding the $k/l$ elements together.

4. The method of claim 3, wherein adding the $k/l$ elements together is done mod q, wherein q is a modulus.

5. The method of claim 1, wherein subtracting the second subset of coefficients from one of the shares of the first subset of coefficients is done mod q, wherein q is a modulus.

6. The method of claim 1, wherein generating a sum of the product of each of the elements of the reduced subset of coefficients with their respective random numbers is done mod q, wherein q is a modulus.

7. The method of claim 1, wherein arithmetic operations are done mod q, wherein q is a modulus, further comprising selecting values for q and $l$ such that $q^{-(l-1)}$ is less than specified leak probability.

8. The method of claim 1, wherein arithmetic operations are done mod q, wherein q is a modulus, further comprising selecting values for q, $m$, and $k$ such that $$q^{-\frac{m}{k}}$$

is less than specified comparison failure rate.

9. A polynomial comparator configured to compare a first and a second polynomial, comprising:
    a memory;
    a processor coupled to the memory, wherein the processor is further configured to:
    select a first subset of $k$ coefficients of the first polynomial and a second subset of $k$ corresponding coefficients of the second polynomial, wherein the coefficients of the first polynomial are split into $n$ shares and the first and second polynomials have $m$ coefficients;
    subtract the second subset of coefficients from one of the shares of the first subset of coefficients;
    reduce the number of elements in the first subset of coefficients to $l$ elements by combining groups of $k/l$ elements together;
    generate a random number for each of the elements of the reduced subset of coefficients;
    sum the product of each of the elements of the reduced subset of coefficients with their respective random numbers;
    sum the $n$ shares of the sum of the products; and
    generate an output indicating that the first polynomial does not equal the second polynomial when the sum does not equal zero.

10. The polynomial comparator of claim 9, further comprising repeating the steps of claim 1 $m/k$ times such that all of the $m$ coefficients of the first and second polynomials are selected.

11. The polynomial comparator of claim 9, wherein combining groups of $k/l$ elements together includes adding the $k/l$ elements together.

12. The polynomial comparator of claim 11, wherein adding the $k/l$ elements together is done mod q, wherein q is a modulus.

13. The polynomial comparator of claim 9, wherein subtracting the second subset of coefficients from one of the shares of the first subset of coefficients is done mod q, wherein q is a modulus.

14. The polynomial comparator of claim 9, wherein generating a sum of the product of each of the elements of the reduced subset of coefficients with their respective random numbers is done mod q, wherein q is a modulus.

15. The polynomial comparator of claim 9, wherein arithmetic operations are done mod q, wherein q is a modulus, further comprising selecting values for q and $l$ such that $q^{-(l-1)}$ is less than specified leak probability.

16. The polynomial comparator of claim 9, wherein arithmetic operations are done mod q, wherein q is a modulus, further comprising selecting values for q, $m$, and $k$ such that $$q^{-\frac{m}{k}}$$

is less man specified comparison failure rate.

* * * * *